(12) United States Patent
Lu et al.

(10) Patent No.: US 10,579,857 B2
(45) Date of Patent: Mar. 3, 2020

(54) TERMINAL CONTROL METHOD AND DEVICE BASED ON FINGERPRINT RECOGNITION KEY, AND TERMINAL

(71) Applicant: FOCALTECH ELECTRONICS, LTD., Grand Cayman (KY)

(72) Inventors: YingChuan Lu, Guangdong (CN); Zhewei Tang, Guangdong (CN); Jingkai Zhang, Guangdong (CN); Wei Huang, Guangdong (CN)

(73) Assignee: FOCALTECH ELECTRONICS, LTD., Grand Cayman (KY)

( * ) Notice: Subject to any disclaimer, the term of this patent is extended or adjusted under 35 U.S.C. 154(b) by 15 days.

(21) Appl. No.: 15/990,260

(22) Filed: May 25, 2018

(65) Prior Publication Data

US 2019/0213384 A1 Jul. 11, 2019

(30) Foreign Application Priority Data

Jan. 10, 2018 (CN) .......................... 2018 1 0022992

(51) Int. Cl.
*G06K 9/00* (2006.01)
*G06F 1/3231* (2019.01)
(Continued)

(52) U.S. Cl.
CPC ....... *G06K 9/00087* (2013.01); *G06F 1/3231* (2013.01); *G06F 1/3296* (2013.01);
(Continued)

(58) Field of Classification Search
CPC . G06K 9/00087; G06F 1/3231; G06F 1/3296; G06F 3/0414; G06F 3/0488; G06F 21/32; H04W 52/0254
See application file for complete search history.

(56) References Cited

U.S. PATENT DOCUMENTS

2008/0117188 A1 5/2008 Ko et al.
2014/0176332 A1* 6/2014 Alameh ................. G06F 21/32
340/665

(Continued)

FOREIGN PATENT DOCUMENTS

| CN | 101192256 A | 6/2008 |
| CN | 106791065 A | 5/2017 |
| TW | 200825837 A | 6/2008 |

OTHER PUBLICATIONS

The 1st Office Action dated Apr. 15, 2019 for Taiwanese Application No. TW107118195.

*Primary Examiner* — Stephen G Sherman
(74) *Attorney, Agent, or Firm* — Yue (Robert) Xu; Apex Attorneys at Law, LLP (57) ABSTRACT

A terminal control method based on a fingerprint recognition key, a terminal control device based on a fingerprint recognition key, and a terminal are provided. The method includes: detecting a touch operation on the fingerprint recognition key, acquiring a touch parameter of the touch operation; and controlling a running state of a terminal, in a case where the touch parameter meets a preset condition. With the method, the terminal is controlled by the fingerprint recognition key to switch its running state, such as a turned-on state, a turned-off state, a sleep state, an awake state, a locked state, thereby simplify an operation and improving a user experience. In this case, the power key is cancelled since the function of the power key is implemented by the fingerprint recognition key, thereby reducing the physical components and thus the fabrication cost of the terminal.

10 Claims, 7 Drawing Sheets

(51) Int. Cl.
  *G06F 3/041*    (2006.01)
  *G06F 21/32*    (2013.01)
  *G06F 3/0488*   (2013.01)
  *G06F 1/3296*   (2019.01)
  *H04W 52/02*    (2009.01)

(52) U.S. Cl.
  CPC .......... *G06F 3/0414* (2013.01); *G06F 3/0488* (2013.01); *G06F 21/32* (2013.01); *H04W 52/0254* (2013.01)

(56) References Cited

U.S. PATENT DOCUMENTS

| | | | |
|---|---|---|---|
| 2015/0074615 A1* | 3/2015 | Han | G06K 9/00033 |
| | | | 715/863 |
| 2017/0255269 A1* | 9/2017 | Yang | G06F 3/016 |
| 2018/0114010 A1* | 4/2018 | Van Os | G06F 21/32 |
| 2018/0341799 A1* | 11/2018 | Schwartz | G06F 3/03547 |

* cited by examiner

TERMINAL CONTROL METHOD AND DEVICE BASED ON FINGERPRINT RECOGNITION KEY, AND TERMINAL

CROSS REFERENCE TO RELATED APPLICATION

The present application claims the priority to Chinese Patent Application No. 201810022992.6, titled "TERMINAL CONTROL METHOD AND DEVICE BASED ON FINGERPRINT RECOGNITION KEY, AND TERMINAL", filed on Jan. 10, 2018 with the State Intellectual Property Office of the People's Republic of China, which is incorporated herein by reference in its entirety.

FIELD

The present disclosure relates to the technical field of computer, and in particular to a terminal control method based on a fingerprint recognition key, a terminal control device based on a fingerprint recognition key, and a terminal.

BACKGROUND

With the rapid development of fingerprint recognition technology, it is widely applied to terminals (such as a mobile phone, a tablet computer, a laptop computer and a personal computer (PC)), to authenticate users with fingerprints.

A fingerprint recognition key is arranged on a terminal for acquiring user fingerprint data. The fingerprint data acquired by the fingerprint recognition key is provided to a fingerprint recognition module arranged inside the terminal. Then, the fingerprint recognition module determines whether the acquired fingerprint data is consistent with pre-stored fingerprint data. The user authentication succeeds if the acquired fingerprint data is consistent with the pre-stored fingerprint data, and fails if the acquired fingerprint data is not consistent with the pre-stored fingerprint data.

On a current laptop computer, a power key and a fingerprint recognition key are arranged as separate modules. That is, the power key and the fingerprint recognition key are both arranged on the laptop computer, causing a waste of physical components and thus a high cost. In addition, the separately arranged power key and fingerprint recognition key result in complex user operations and poor user experience.

SUMMARY

In view of the above, a terminal control method based on a fingerprint recognition key, a terminal control device based on a fingerprint recognition key and a terminal are provided according to the present disclosure, to replace a power key with the fingerprint recognition key, thereby reducing the cost, simplifying the user operation and improving the user experience. In order to achieve the above objects, technical solutions according to the present disclosure are provided as follows.

A terminal control method based on a fingerprint recognition key is provided according to a first aspect of the present disclosure. The method includes: detecting a touch operation on the fingerprint recognition key; acquiring a touch parameter of the touch operation; and controlling a running state of a terminal in a case where the touch parameter meets a preset condition, where the running state includes a turned-on state, a turned-off state, a sleep state, an awake state and a locked state.

In the terminal control method based on the fingerprint recognition key, the touch operation is detected on the fingerprint recognition key, and the touch parameter of the touch operation is acquired. The running state of the terminal is controlled in a case where the touch parameter meets the preset condition. With the method, the running state of the state can be controlled by using the fingerprint recognition key, thereby simplifying the user operation and improving the user experience. In addition, the power key is cancelled since the function of the power key is implemented by the fingerprint recognition key, thereby reducing the physical components and thus the fabrication cost of the terminal.

In a possible implantation of the first aspect, the touch parameter includes a touch duration. The controlling a running state of the terminal in a case where the touch parameter meets the preset condition includes: generating a low-level power switching control signal in a case where the touch duration is greater than or equal to a preset duration threshold; and controlling the running state of the terminal based on a current state of the terminal, in a case where the low-level power switching control signal is detected.

In the terminal control method based on the fingerprint recognition key according to the implementation, only one preset duration threshold needs to be set. The low-level power switching control signal is generated in a case where the touch duration exceeds the preset duration threshold. A processor in the terminal controls the running state of the terminal based on a current state of terminal after detecting the low-level power switching control signal, thereby simplifying the user operation and improving the user experience.

In another possible implementation of the first aspect, the controlling the running state of the terminal based on a current state of the terminal in a case where the low-level power switching control signal is detected includes: in a case where the current state is the turned-on state, controlling the terminal to be locked, to sleep, or to be turned off; in a case where the current state is the sleep state, waking up the terminal or controlling the terminal to be turned off; and in a case where the current state is the turned-off state, controlling the terminal to be turned on.

In another possible implementation of the first aspect, the touch parameter includes a touch duration. The controlling a running state of the terminal in a case where the touch parameter meets the preset condition includes: generating a first control signal in a case where the touch duration is greater than or equal to a first preset duration threshold and is less than a second preset duration threshold, and controlling the terminal to sleep or wake up in response to the first control signal; generating a second control signal in a case where the touch duration is greater than or equal to the second preset duration threshold, and controlling the terminal to be turned on or turned off in response to the second control signal; and generating a third control signal in a case where the touch duration is less than the first preset duration threshold, and controlling the terminal to be locked in response to the third control signal.

With the terminal control method based on the fingerprint recognition key according to the implementation, different control signals are generated based on different touch durations, and the processor in the terminal controls the running state of the terminal in response to the different control signals, thereby achieving an accurate control result.

In another possible implementation of the first aspect, the touch parameter includes a touch duration and a touch pressure. The controlling a running state of the terminal in a case where the touch parameter meets the preset condition includes: controlling the running state of the terminal in a case where the touch duration is greater than or equal to a preset duration threshold and the touch pressure is greater than or equal to a preset pressure threshold.

With the terminal control method based on the fingerprint recognition key according to the implementation, the touch parameter includes the touch duration and the touch pressure, and the running state is controlled only if both the touch duration and the touch pressure meet the preset conditions, thereby preventing a misoperation by a user and improving the control accuracy.

In a possible implementation of the first aspect, the method further includes: acquiring and storing fingerprint data when the touch operation is detected on the fingerprint recognition key; and performing an unlock operation by using the fingerprint data, after a system start or foreground running recovery of the terminal.

With the terminal control method based on the fingerprint recognition key according to the implementation, when is detected on the fingerprint recognition key, a frame of fingerprint data is collected and stored. An authentication is performed by directly using the pre-acquired fingerprint data, after the terminal is turned on or a foreground running is recovered. Therefore, it is unnecessary for the user to again touch the fingerprint recognition key after the terminal is turned on or the foreground running is recovered, thereby reducing the number of operations by the user and improving the user experience.

In a possible implementation of the first aspect, the terminal further includes a sensory feedback component, and the method further includes controlling a running state of the sensory feedback component based on the touch parameter of the touch operation. With the implementation, the visual and/or touch experience of the user are/is improved by controlling the running state of the sensory feedback component.

A terminal control device based on a fingerprint recognition key is provided according to a second aspect. The device includes: a detection module, configured to detect a touch operation on the fingerprint recognition key; a first acquisition module, configured to acquire a touch parameter of the touch operation; and a first control module, configured to control a running state of the terminal in a case where the touch parameter meets a preset condition, where the running state includes a turned-on state, a turned-off state, a sleep state, an awake state and a locked state.

In a possible implementation of the second aspect, the touch parameter includes a touch duration. The first control module includes: a first control signal generation sub-module, configured to generate a low-level power switching control signal in a case where the touch duration is greater than or equal to a preset duration threshold; and a first control sub-module, configured to control the running state of the terminal based on a current state of the terminal, in a case where the low-level power switching control signal is detected.

In a possible implementation of the second aspect, the first control sub-module is configured to: in a case where the current state is the turned-on state, control the terminal to be locked, to sleep or to be turned off; in a case where the current state is the sleep state, wake up the terminal or control the terminal to be turned off; and in a case where the current state is the turned-off state, control the terminal to be turned on.

In a possible implementation of the second aspect, the touch parameter includes a touch duration. In this case, the first control module includes: a second control signal generation sub-module, configured to generate a first control signal in a case where the touch duration is greater than or equal to a first preset duration threshold and is less than a second preset duration threshold; a second control sub-module, configured to control the terminal to sleep or wake up in response to the first control signal; a third control signal generation sub-module, configured to generate a second control signal in a case where the touch duration is greater than or equal to the second preset duration threshold; a third control sub-module, configured to control the terminal to be turned on or turned off in response to the second control signal; a fourth control signal generation module, configured to generate a third control signal in a case where the touch duration is less than the first preset duration threshold; and a fourth control sub-module, configured to control the terminal to be locked in response to the third control signal.

In a possible implementation of the second aspect, the touch parameter includes a touch duration and a touch pressure. The first control module is configured to control the running state of the terminal in a case where the touch duration is greater than or equal to a preset duration threshold and the touch pressure is greater than or equal to a preset pressure threshold.

In a possible implementation of the second aspect, the device further comprises a second acquisition module, configured to acquire and store fingerprint data, when the touch operation is detected on the fingerprint recognition key; and an unlocking module, configured to perform an unlock operation by using the fingerprint data, after a system start or foreground running recovery of the terminal.

In a possible implementation of the second aspect, the terminal further includes a sensory feedback component, and the device further includes a second control module, configured to control a running state of the sensory feedback component based on the touch parameter of the touch operation.

A terminal is provided according to a third aspect. The terminal includes: a memory, a processor and an input/output device. The memory is configured to store programs executable by the processor, and the processor is configured to execute the programs to perform the terminal control method based on the fingerprint recognition key according to any one of the possible implementations of the first aspect.

In the terminal control method based on the fingerprint recognition key according to the embodiments of the present disclosure, the touch operation is detected on the fingerprint recognition key and the touch parameter of the touch operation is acquired, and the running state of the terminal is controlled in a case where the touch parameter meets the preset condition. With the method, the terminal is controlled to switch its running state (such as turned-on state and turned-off state) by using the fingerprint recognition key, thereby simplifying the user operation and improving the user experience. In addition, the power key is cancelled since the function of the power key is implemented by the fingerprint recognition key, thereby reducing the physical components and thus the fabrication cost of the terminal.

BRIEF DESCRIPTION OF THE DRAWINGS

The drawings to be used in the description of the embodiments or the conventional technology will be described briefly as follows, so that the technical solutions according to the embodiments of the present disclosure or according to the conventional technology will become clearer. It is apparent that the drawings in the following description only illustrate some embodiments of the present disclosure. For those skilled in the art, other drawings may be obtained according to these drawings without any creative work.

DETAILED DESCRIPTION OF EMBODIMENTS

At present, a fingerprint recognition key is generally arranged on a fingerprint recognition-supported terminal, to acquire user fingerprint data. Meanwhile, the terminal is further arranged with a power key. Hence, the fingerprint recognition key and the physical power key are both arranged on the terminal, which causes a resource waste to a certain extent and a high cost. A terminal control method based on a fingerprint recognition key is provided according to the present disclosure, in which the fingerprint recognition key, instead of the power key, controls the running state of the terminal such as a turned-on state, a turned-off state, an awake state, a sleep state and a locked state, thereby simplifying the operation and improving the user experience. In addition, the power key is not arranged in the terminal, thereby reducing the physical components and thus the fabrication cost of the terminal.

In order to make the objectives, technical solutions and advantages of embodiments of the present disclosure clearer, the technical solution according to the embodiments of the present disclosure will be described clearly and completely as follows in conjunction with the drawings. It is apparent that the described embodiments are only a few rather than all of the embodiments according to the present disclosure. Any other embodiments obtained by those skilled in the art based on the embodiments in the present disclosure without any creative work fall in the scope of the present disclosure.

Figure 1:
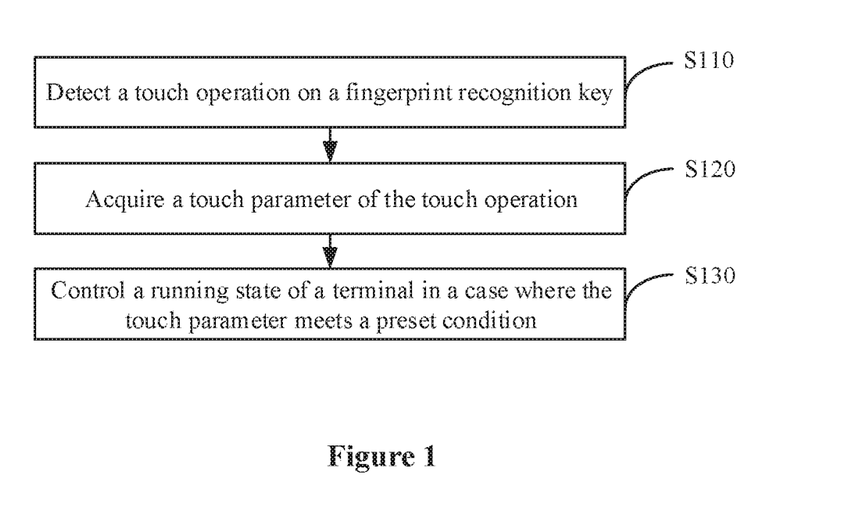
FIG. 1 is a flowchart of a terminal control method based on a fingerprint recognition key according to an embodiment of the present disclosure.

Reference is made to FIG. 1, which shows a flowchart of a terminal control method based on a fingerprint recognition key according to an embodiment of the present disclosure. The method is applied to a fingerprint recognition-supported terminal. As shown in FIG. 1, the method may include steps S110 to S130.

In S110, a touch operation is detected on the fingerprint recognition key.

A fingerprint recognition chip in a terminal scans at a certain frequency the fingerprint recognition key for fingerprint data. If fingerprint data is detected by the scan, it is determined that a user finger touches the fingerprint recognition key, that is, the touch operation is detected.

In S120, a touch parameter of the touch operation is acquired.

After detecting the touch operation, the fingerprint recognition chip acquires the touch parameter of the touch operation. The touch parameter represents a feature of the touch operation. For example, the touch parameter includes a touch duration, a touch pressure, and the like.

According to an embodiment of the present disclosure, timing starts when the touch operation is detected on the fingerprint recognition key, and ends when it is detected that the touch operations ends, so as to obtain a touch duration of the current touch operation.

The touch pressure may be acquired by a pressure sensor arranged on the fingerprint recognition functional key.

According to an embodiment of the present disclosure, in a case where the fingerprint recognition chip cannot detect fingerprint data on the fingerprint recognition key by the scan, it is determined that the user finger leaves the fingerprint recognition key and the touch operation ends.

In S130, a running state of the terminal is controlled in a case where the touch parameter meets a preset condition. The running state includes a turned-on state, a turned-off state, a sleep state, an awake state and a locked state.

The touch parameter and the corresponding preset condition may be set as needed. For example, if the touch parameter includes a touch duration, the preset condition includes a preset duration threshold; and if the touch parameter includes a touch duration and a touch pressure, the preset condition includes a preset duration threshold and a preset pressure threshold.

If the touch parameter acquired by the fingerprint recognition chip meets the preset condition, a corresponding control signal is outputted. After detecting the control signal outputted by the fingerprint recognition chip, a processor in the terminal controls the running state of the terminal, such as the turned-on state, the turned-off state, the sleep state, the awake state and the locked state.

The processor in the embodiment may be a Central Processing Unit (CPU) of the terminal, a Microcontroller Unit (MCU) integrated in the terminal or a combination thereof.

In the terminal control method based on the fingerprint recognition key according to the embodiment of the present disclosure, the touch operation is detected on the fingerprint recognition key and the touch parameter of the touch operation is acquired, and the running state of the terminal is controlled in a case where the touch parameter meets the preset condition. With the method, the running state of the terminal is controlled by using the fingerprint recognition key, thereby simplifying the user operation and improving the user experience. In addition, the power key is cancelled since the function of the power key is implemented by the fingerprint recognition key, thereby reducing the physical components and thus the fabrication cost of the terminal.

Figure 2:
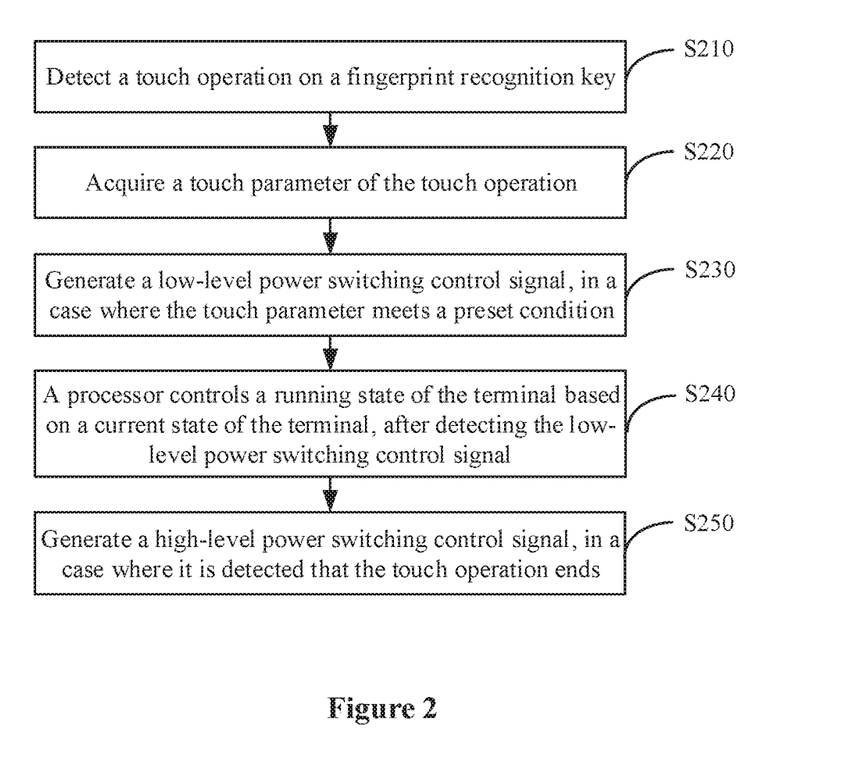
FIG. 2 is a flowchart of another terminal control method based on a fingerprint recognition key according to an embodiment of the present disclosure.

Reference is made to FIG. 2, which shows a flowchart of a terminal control method based on a fingerprint recognition key according to an embodiment of the present disclosure. The method is applied to a fingerprint recognition-supported terminal. In the embodiment, a low-level power switching control signal is generated in a case where the fingerprint recognition chip detects that the touch parameter meets the preset condition. As shown in FIG. 2, the method includes steps S210 to S250.

In S210, a touch operation is detected on the fingerprint recognition key.

In S220, a touch parameter of the touch operation is acquired.

According to an embodiment of the present disclosure, the touch parameter includes a touch duration.

According to another embodiment of the present disclosure, the touch parameter includes a touch duration and a touch pressure.

In S230, a low-level power switching control signal is generated in a case where the touch parameter meets a preset condition.

In a case where the touch parameter of the touch operation acquired by the fingerprint recognition chip meets the preset condition, the low-level power switching control signal is outputted.

If the touch parameter includes the touch duration, then the preset condition is that the touch duration is greater than or equal to a preset duration threshold.

If the touch parameter includes the touch duration and the touch pressure, then the preset condition is that the touch duration is greater than or equal to a preset duration threshold and the touch pressure is greater than or equal to a preset pressure threshold.

In a case where it is determined by the fingerprint recognition chip that the touch parameter meets the preset condition, a specified pin (for example, the pin referred to as Pwr_Ctrol pin) of the fingerprint recognition chip outputs a low-level signal and transmits the low-level signal to a processor of the terminal. In this way, the fingerprint recognition key is used as a physical power key.

In the embodiment, only one preset duration threshold is needed, which may be set as required, such as 20 milliseconds.

The Pwr_Ctrol pin always outputs the low-level signal as long as the touch parameter meets the preset condition.

In S240, the processor controls a running state of the terminal based on a current state in a case where the low-level power switching control signal is detected.

In a case where the current state of the terminal is the turned-on state, the terminal is controlled to be locked, to sleep or to be turned off. In a case where the current state of the terminal is the sleep state, the terminal is controlled to be woken up or to be turned off. In a case where the current state of the terminal is the turned-off state, the terminal is controlled to be turned on.

In a case where the terminal is in the turned-off state, the terminal is powered and then the chips inside the terminal are powered. Then, the fingerprint recognition chip can detect a touch operation, and the processor inside the terminal can receive the signal from the fingerprint recognition chip.

In S250, a high-level power switching control signal is generated if it is detected that the touch operation ends.

When the touch operation ends, the Pwr_Ctrol pin of the fingerprint recognition chip outputs a high-level signal, so as to output a low-level signal again next time when it is detected that the touch parameter meets the preset condition next time.

In a case where it is detected by the processor in the terminal that the signal outputted by the Pwr_Ctrol pin of the fingerprint recognition chip is a low-level signal, the terminal is controlled to switch its state based on the current state of the terminal. For example, if the terminal is already turned on, the processor in the terminal controls, when detecting that the Pwr_Ctrl pin of the fingerprint recognition chip outputs a low-level signal, the terminal to be locked, to sleep or to be turned off, which may be set as needed. If the terminal is currently in the turned-off state, then the processor in the terminal controls the terminal to be turned on when detecting that the Pwr_Ctrol pin of the fingerprint recognition chip outputs a low-level signal. If the current state of the terminal is the sleep state, the processor in the terminal may, when detecting that the Pwr_Ctrol pin of the fingerprint recognition chip outputs a low-level signal, wake up the terminal or control the terminal to be turned off, which may be set as needed.

The processor in the embodiment may be a CPU of the terminal, an MCU integrated in the terminal or a combination thereof.

In the terminal control method based on the fingerprint recognition key according to the embodiment, when the touch operation is detected on the fingerprint recognition key, the touch parameter of the touch operation is acquired. The specified pin of the fingerprint recognition chip outputs the low-level power switching control signal in a case where the touch parameter meets the preset condition. The processor controls the running state of the terminal based on the current state of the terminal after detecting the low-level power switching control signal, thereby simplifying the user operation and improving the user experience. With the method, the function of the power key can be achieved with the fingerprint recognition key. That is, the power key is replaced with the fingerprint recognition key and is unnecessary to be arranged, thereby reducing the cost.

Figure 3:
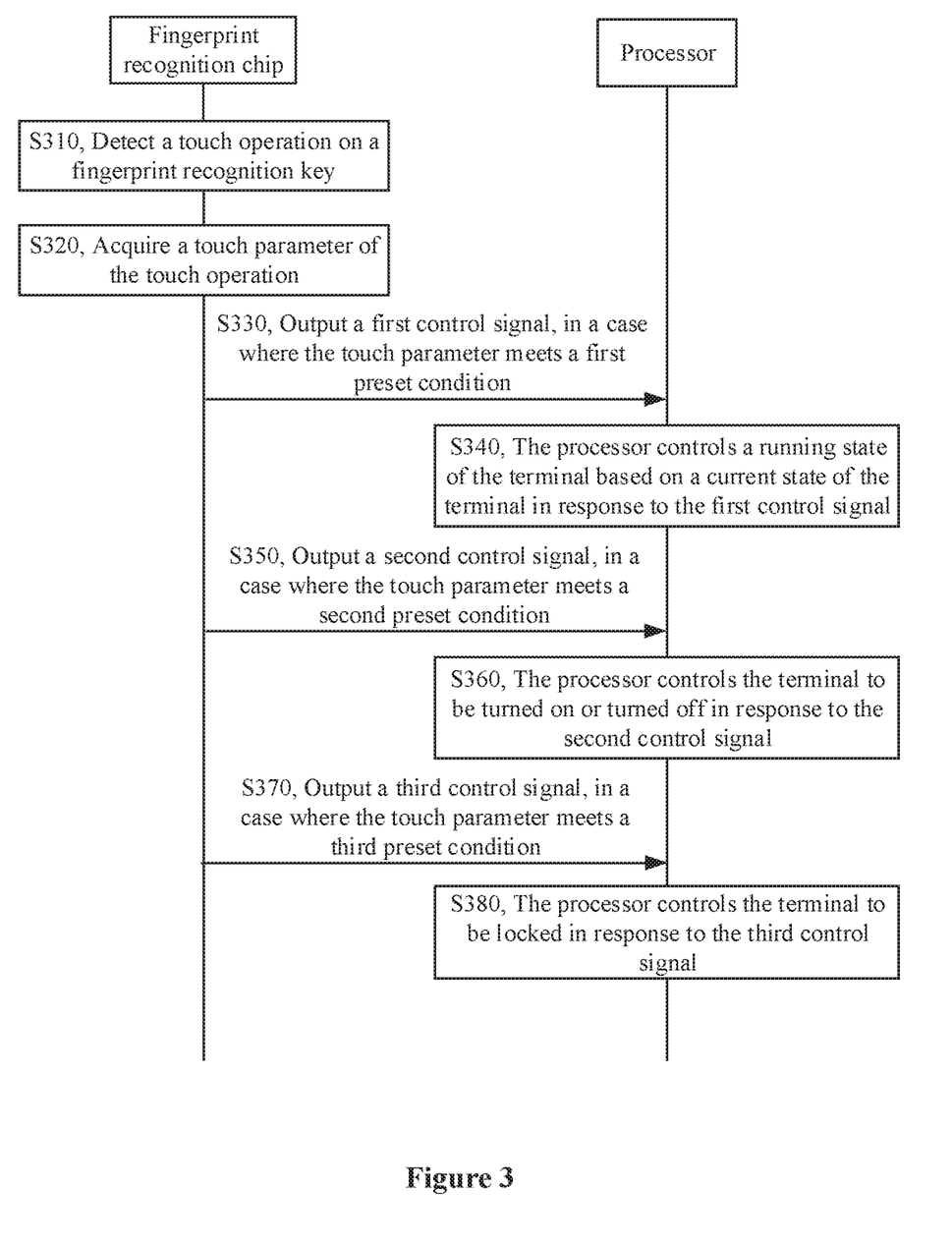
FIG. 3 is a flowchart of another terminal control method based on a fingerprint recognition key according to an embodiment of the present disclosure.

Reference is made to FIG. 3, which shows a flowchart of a terminal control method based on a fingerprint recognition key according to an embodiment of the present disclosure. The method is applied to a terminal including at least a fingerprint recognition key, a fingerprint recognition chip and a processor.

In the embodiment, the fingerprint recognition chip generates different control signals based on different touch durations, and provides the signals to the processor of the terminal. As shown in FIG. 3, the method may include steps S310 to S380.

In S310, a touch operation is detected on the fingerprint recognition key.

In S320, a touch parameter of the touch operation is acquired.

The touch parameter may include a touch duration, or the touch parameter may include s touch duration and a touch pressure.

In S330, a first control signal is outputted in a case where the touch parameter meets a first preset condition.

If the touch parameter includes a touch duration, then the first preset condition is that the touch parameter is greater than or equal to a first preset duration threshold and is less than a second preset duration threshold. The first preset duration threshold and the second preset duration threshold may be set as needed. For example, the first preset duration threshold may be 20 milliseconds, and the second preset duration threshold may be 10 seconds, 15 seconds and the like.

If the touch parameter includes a touch duration and a touch pressure, the first preset condition includes that: the touch duration is greater than or equal to a first preset duration threshold and is less than a second duration threshold, and the touch pressure is greater than or equal to a preset pressure threshold. A control signal is generated only if both the touch duration and the touch pressure meet the preset condition, thereby preventing a misoperation by a user and improving a control accuracy.

The current touch operation is determined as a short-press operation and the first control signal is outputted, in a case where the touch parameter meets the first preset condition.

In S340, a processor controls a running state of the terminal based on a current state of the terminal in response to the first control signal.

When detecting the first control signal outputted by the fingerprint recognition chip, the processor in the terminal determines that the current touch is a short-press operation and controls the terminal to sleep or wake up.

For example, if the terminal is currently in the sleep state, the terminal is woken up when the first control signal is detected. If the terminal is currently in the turned-on state, the terminal is controlled to sleep when the first control signal is detected.

In S350, a second control signal is outputted in a case where the touch parameter meets a second preset condition.

If the touch parameter includes a touch duration, then the second preset condition is that the touch duration is greater than a second preset duration threshold.

If the touch parameter includes a touch duration and a touch pressure, the second preset condition includes that: the touch duration is greater than a second preset duration threshold, and the touch pressure is greater than a preset pressure threshold.

The current touch operation is determined as a long-press operation and the second control signal is outputted, in a case where the touch parameter meets the second preset condition.

In S360, the processor controls the terminal to be turned on or turned off in response to the second control signal.

After detecting the second control signal, the processor determines that the current operation is a long-press operation and controls the terminal to be turned on or turned off based on the current state of the terminal.

For example, if the current state of the terminal is the turned-on state, the terminal is controlled to be turned off after the second control signal is detected. If the current state of the terminal is the turned-off state, the terminal is controlled to be turned on after the second control signal is detected.

In S370, a third control signal is outputted in a case where the touch parameter meets a third preset condition.

If the touch parameter includes a touch duration, then the third preset condition is that the touch parameter is less than the first preset duration threshold. If the touch parameter includes a touch duration and a touch pressure, the third preset condition includes that: the touch duration is less than the first preset duration threshold, and the touch pressure is greater than the preset pressure threshold.

In S380, the processor controls the terminal to be locked in response to the third control signal.

In a case where the third control signal is detected by the processor and the terminal is currently in the turned-on state, the processor controls the terminal to be locked.

The processor according to the embodiment may be the CPU of the terminal, an MCU integrated in the terminal or a combination thereof.

In the terminal control method based on the fingerprint recognition key according to the embodiment, when the touch operation is detected on the fingerprint recognition key, the touch parameter of the touch operation is acquired. In a case where the touch parameter meets the first preset condition, the first control signal is outputted and the processor controls the terminal to sleep or wake up in response to the first control signal. In a case where the touch parameter meets the second preset condition, the second control signal is outputted and the processor controls the terminal to be turned on or turned off in response to the second control signal. In a case where the touch parameter meets the third preset condition, the third control signal is outputted and the processor controls the terminal to be locked in response to the third control signal. With the method, the different control signals are generated based on different touch durations of touch operations, and then the processor controls the running state of the terminal in response to the respective control signals, thereby simplifying the user operation and improving the user experience. In addition, with the method, the power key is replaced with the fingerprint recognition key and is unnecessary to be arranged, thereby reducing the cost.

Figure 4:
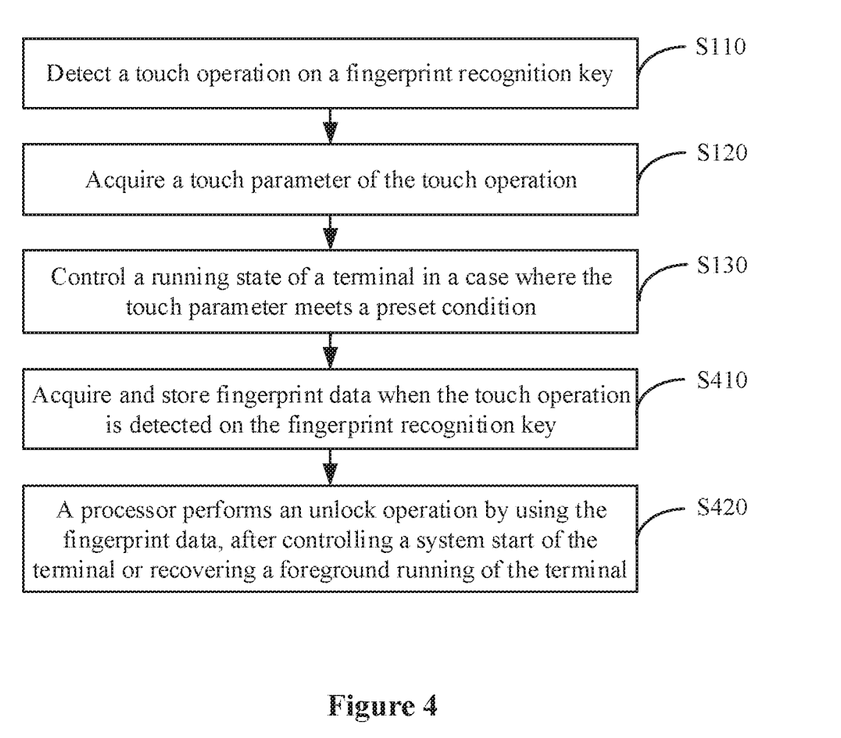
FIG. 4 is a flowchart of another terminal control method based on a fingerprint recognition key according to an embodiment of the present disclosure.

Reference is made to FIG. 4, which shows a flowchart of a terminal control method based on a fingerprint recognition key according to an embodiment of the present disclosure. In the embodiment, after detecting a touch operation on a fingerprint recognition key, the fingerprint recognition chip collects and stores fingerprint data. Hence, an unlock operation may be performed by directly using the fingerprint data after the terminal is turned on. That is, the terminal is turned on and unlocked by one step, thereby simplifying the user operation and improving the user experience.

On the basis of any one of the above terminal control methods based on the fingerprint recognition key, the method according to the embodiment may further includes the following steps. For example, as shown in FIG. 4, the method further includes steps S410 and S420 on the basis of the embodiment shown in FIG. 1.

In S410, in a case where a touch operation is detected on the fingerprint recognition key, fingerprint data is acquired and stored.

In S420, the processor performs an unlock operation by using the fingerprint data after controlling a system start of the terminal or recovering a foreground running of the terminal.

In an embodiment of the present disclosure, a scenario of recovering the foreground running may include: waking up a terminal in the sleep state and unlocking a terminal.

When the touch operation is detected on the fingerprint recognition key in step S110, a frame of fingerprint data is scanned and stored. Then, the fingerprint data may be read in a case of a start, an awake or an unlocking of system. The fingerprint data is compared with pre-stored fingerprint data of the user. If the acquired fingerprint data is the same as the pre-stored fingerprint data, an authentication is successful. If the acquired fingerprint data is different from the pre-stored fingerprint data, it may be prompted to input a password or re-input a fingerprint.

The processor in the embodiment may be a CPU of the terminal, an MCU integrated in the terminal or a combination thereof.

In the terminal control method based on the fingerprint recognition key according to the embodiment, when the touch operation is detected on the fingerprint recognition key, a frame of fingerprint data is collected and stored. The authentication is performed by directly using the collected fingerprint data after the terminal is turned on or the foreground running is recovered. In this case, it is unnecessary for the user to again perform a touch operation on the fingerprint recognition key after the system start or the foreground running recovery, thereby reducing the number of operations by the user and improving the user experience.

In an embodiment of the present disclosure, a sensory feedback component, such as an LED lamp, a vibrator or a miniature motor, may be connected to the fingerprint recognition chip.

For example, in a case where the sensory feedback component is the LED lamp, when the touch operation is detected on the fingerprint recognition key, the LED lamp is controlled to be lightened or flash, and the brightness and flashing frequency of the LED lamp are controlled based on a duration of the touch operation. In this way, a brightness gradient effect of the LED lamp is achieved in different touch scenarios, thereby enhancing a visual experience of user.

For another example, in a case where the sensory feedback component is a vibrator (or miniature motor), the vibrator (or miniature motor) is controlled to vibrate once when a touch operation is detected on the fingerprint recognition key, thereby enhancing a tactile experience of user.

For sake of simplicity, the above-described embodiments are described in a combination of steps, but it is understood by those skilled in the art that the present disclosure is not limited to the sequence of the described steps. According to the present disclosure, some of the steps may be performed in other sequences or at the same time. It is also understood by those skilled in the art that the embodiments described in the specification are preferred embodiments, that is, not all involved steps and modules are necessary for an embodiment.

Corresponding to the above embodiments of the terminal control method based on the fingerprint recognition key, embodiments of a terminal control device based on a fingerprint recognition key is further provided according to the present disclosure.

Figure 5:
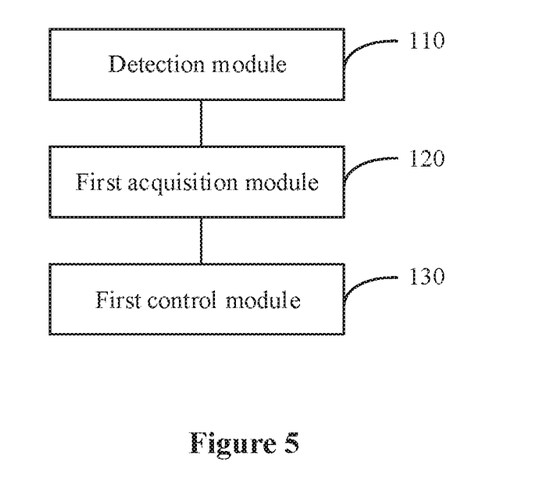
FIG. 5 is a block diagram of a terminal control device based on a fingerprint recognition key according to an embodiment of the present disclosure.

Reference is made to FIG. 5, which shows a block diagram of a terminal control device based on a fingerprint recognition key according to an embodiment of the present disclosure. The device is applied to a fingerprint recognition-supported terminal. As shown in FIG. 5, the device may include a detection module 110, a first acquisition module 120 and a first control module 130.

The detection module 110 is configured to detect a touch operation on the fingerprint recognition chip.

A fingerprint recognition chip in the terminal scans the fingerprint recognition key for fingerprint data at a certain frequency. If fingerprint data is detected by the scan, it is determined that a user finger touches the fingerprint recognition key, that is, a touch operation is detected.

The first acquisition module 120 is configured to acquire a touch parameter of the touch operation.

After detecting the touch operation, the fingerprint recognition chip acquires the touch parameter of the touch operation. The touch parameter represents a feature of the touch operation. For example, the touch parameter includes a touch duration, a touch pressure, and the like.

The first control module 130 is configured to control a running state of the terminal in a case where the touch parameter meets a preset condition. The running state includes at least a turned-on state, a turned-off state, a sleep state, an awake state and a locked state.

The touch parameter and the corresponding preset condition may be set as needed. For example, if the touch parameter includes a touch duration, the preset condition includes a preset duration threshold; and if the touch parameter includes a touch duration and a touch pressure, the preset condition includes a preset duration threshold and a preset pressure threshold.

If the touch parameter acquired by the fingerprint recognition chip meets the preset condition, a corresponding control signal is outputted. After detecting the control signal outputted by the fingerprint recognition chip, a processor in the terminal controls the running state of the terminal, such as the turned-on state, the turned-off state and the awake state.

In an embodiment of the preset disclosure, the touch parameter includes the touch duration. A low-level signal is outputted if it is detected that the touch duration of the touch operation exceeds the preset duration threshold. The processor controls the running state of the terminal based on a current state of the terminal, after detecting the low-level signal.

Figure 6:
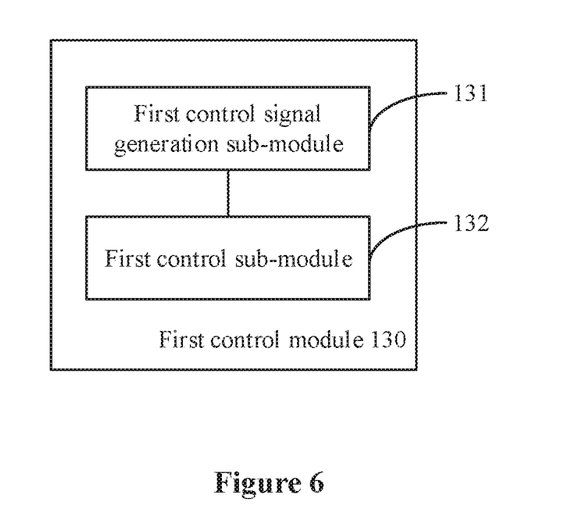
FIG. 6 is a block diagram of a first control module according to an embodiment of the present disclosure.

As shown in FIG. 6, the first control module may include a first control signal generation sub-module 131 and a first control sub-module 132.

The first control signal generation sub-module 131 is configured to generate a low-level power switching control signal in a case where the touch duration is greater than or equal to a preset duration threshold.

The first control sub-module 132 is configured to control the running state of the terminal based on a current state of the terminal, in a case where the low-level power switching control signal is detected.

For example, if the current state of the terminal is the turned-on state, the terminal is controlled to be locked, to sleep or to be turned off. If the current state of the terminal is the sleep state, the terminal is controlled to be woken up or to be turned off if the current state of the terminal is the turned-off state, the terminal is controlled to be turned on.

Figure 7:
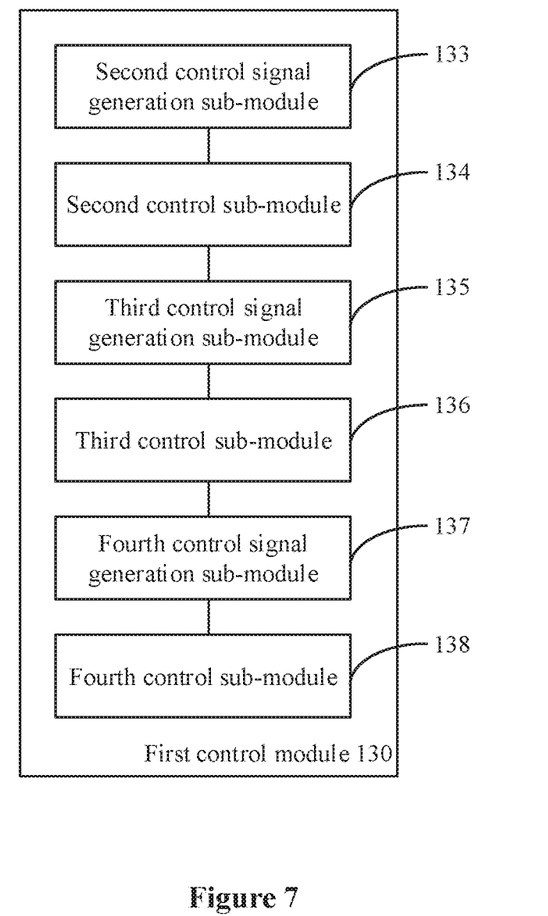
FIG. 7 is a block diagram of another first control module according to an embodiment of the present disclosure.

In another embodiment of the present disclosure, the touch parameter is still the touch duration while the preset duration threshold includes a first preset duration threshold and a second preset duration threshold.

As shown in FIG. 7, the first control module may include a second control signal generation sub-module 133, a second control sub-module 134, a third control signal generation sub-module 135, a third control sub-module 136, a fourth control signal generation sub-module 137 and a fourth control sub-module 138.

The second control signal generation sub-module 133 is configured to generate a first control signal in a case where the touch duration is greater than or equal to a first preset duration threshold and is less than a second preset duration threshold.

The second control sub-module 134 is configured to control the terminal sleep or wake up in response to the first control signal.

The third control signal generation sub-module 135 is configured to generate a second control signal in a case where the touch duration is greater than or equal to the second preset duration threshold.

The third control sub-module 136 is configured to control the terminal to be turned on or turned off in response to the second control signal.

The fourth control signal generation sub-module 137 is configured to generate a third control signal in a case where the touch duration is less than the first preset duration threshold.

The fourth control sub-module 138 is configured to control the terminal to be locked in response to the third control signal.

With the terminal control device based on the fingerprint recognition key according to the embodiment of the present disclosure, the touch operation is detected on the fingerprint recognition key and the touch parameter of the touch operation is acquired, and the running state of the terminal is controlled in a case where the touch parameter meets the preset condition. With the device, the running state of the terminal is controlled by using the fingerprint recognition key, thereby simplifying the user operation and improving the user experience. In addition, the power key is cancelled since the function of the power key is implemented by the fingerprint recognition key, thereby reducing the physical components and thus the fabrication cost of the terminal.

Figure 8:
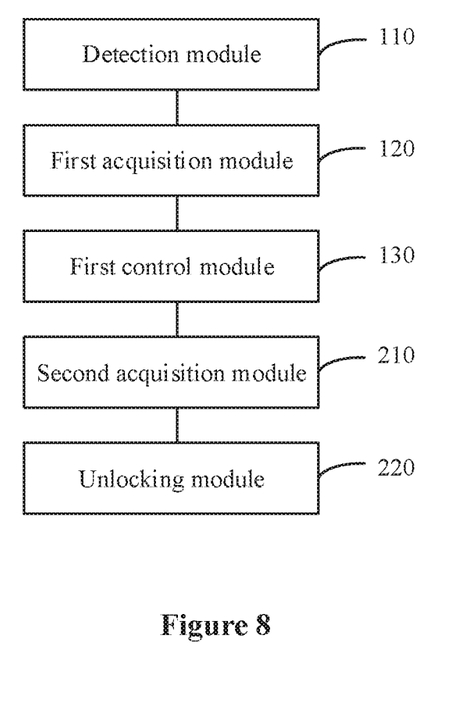
FIG. 8 is a block diagram of another terminal control device based on a fingerprint recognition key according to an embodiment of the present disclosure.

Reference is made to FIG. 8, which shows a block diagram of a terminal control device based on a fingerprint recognition key according to another embodiment of the present disclosure. In the embodiment, when detecting a touch operation on the fingerprint recognition key, a fingerprint recognition chip collects and stores fingerprint data. Hence, an unlock operation may be performed by directly using the fingerprint data after a system start or a foreground running recovery. That is, the terminal is turned on and unlocked by one step, thereby simplifying the user operation and improving the user experience.

Based on the embodiment shown in FIG. 5, the device further includes a second acquisition module 210 and an unlocking module 220.

The second acquisition module 210 is configured to acquire and store fingerprint data, when the touch operation is detected on the fingerprint recognition key.

The unlocking module 220 is configured to perform an unlock operation by using the fingerprint data, after a system start or foreground running recovery of the terminal.

The foreground running recovery may include waking up a terminal in the sleep state, and unlocking a terminal in the locked state.

When the touch operation is detected on the fingerprint recognition key, a frame of fingerprint data is scanned and stored. Then, the fingerprint data may be read in a case of a start, an awake or an unlocking of system. The fingerprint data is compared with pre-stored fingerprint data of the user. If the acquired fingerprint data is the same as the pre-stored fingerprint data, an authentication is successful. If the acquired fingerprint data is different from the pre-stored fingerprint data, it may be prompted to input a password or re-input a fingerprint.

With the terminal control device based on the fingerprint recognition key according to the embodiment, when the touch operation is detected on the fingerprint recognition key, a frame of fingerprint data is collected and stored. The authentication is performed by directly using the acquired fingerprint data after the terminal is turned on or the system is woken up. In this case, it is unnecessary for the user to again perform a touch operation on the fingerprint recognition key after the system start, unlocking or awaking, thereby reducing the number of operations by the user and improving the user experience.

In an embodiment of the present disclosure, a sensory feedback component, such as an LED lamp, a vibrator or a miniature motor, may be connected to the fingerprint recognition chip.

For example, if the fingerprint recognition chip is connected with an LED lamp, after detecting the touch operation on the fingerprint recognition key, the fingerprint recognition chip controls the LED lamp to be lightened or flash, and controls the brightness and flashing frequency of the LED lamp based on a duration of the touch operation, thereby enhancing a visual experience of user. In this way, a brightness gradient effect of the LED lamp is achieved in different touch scenarios.

For another example, in a case where the fingerprint recognition chip is connected with a vibrator (or miniature motor), the vibrator (or miniature motor) is controlled to vibrate once when a touch operation is detected on the fingerprint recognition key, thereby enhancing a tactile experience of user.

In an embodiment of the present disclosure, by integrating a USB protocol conversion chip into the fingerprint recognition chip, output data of the fingerprint recognition chip is converted into data conforming to the USB protocol and then outputted via a USB interface. In this case, the fingerprint recognition chip is directly connected to the processor in the terminal via the USB interface, thereby improving the versatility of the fingerprint recognition chip.

Figure 9:
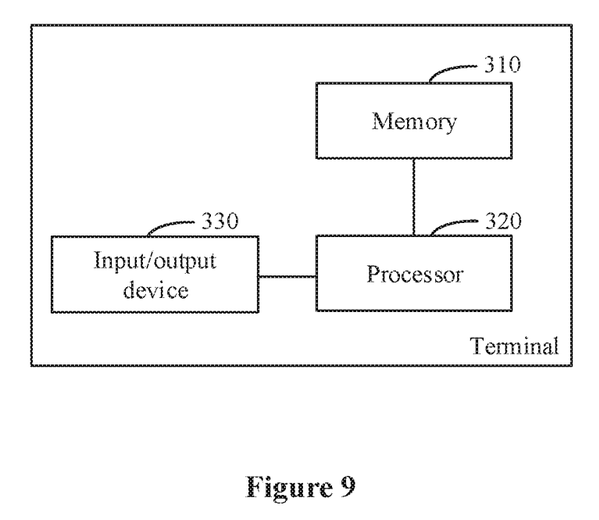
FIG. 9 is a schematic block diagram of a terminal according to an embodiment of the present disclosure.

Reference is made to FIG. 9, which shows a schematic block diagram of a terminal according to an embodiment of the present disclosure. As shown in FIG. 9, the terminal includes a memory 310, a processor 320 and an input/output device 330.

The input/output device 330 may include a display (such as a touch screen, a Liquid Crystal Display (LCD), a Cathode Ray Tube (CRT) display, a holographic imager or projector), a keyboard, a click component (such as a fingerprint recognition key, a sensory feedback component, a mouse, a trackball, a tactile board or a touch screen) and the like.

The memory 310 includes computer readable mediums including a non-permanent memory, a random access memory (RAM) and/or a non-volatile memory, such as read-only memory (ROM) or flash random access memory (flash RAM). The memory includes at least one storage chip. The memory 310 is configured to provide instructions and data to the processor 320.

In some embodiments, an operating system and application modules may be stored in the memory 310. The operating system includes various system programs, for realizing various basic services and processing hardware-based tasks. The application modules include various applications such as a web browser and a desktop, for realizing various application services.

In the embodiment of the present disclosure, the processor 320 invokes the program or instructions stored in the memory 310 to perform the following steps: detecting a touch operation on the fingerprint recognition key; acquiring a touch parameter of the touch operation; and controlling, in a case where the touch parameter meets a preset condition, a running state of a terminal. The running state includes a turned-on state, a turned-off state, a sleep state, an awake state and a locked state.

In the terminal control device based on the fingerprint recognition key according to the embodiment of the present disclosure, the touch operation is detected on the fingerprint recognition key and the touch parameter of the touch operation is acquired, and the running state of the terminal is controlled in a case where the touch parameter meets the preset condition. With the method, the terminal is controlled to switch its running state (such as turned-on state and turned-off state) by using the fingerprint recognition key, thereby simplifying the user operation and improving the user experience. In addition, the power key is cancelled since the function of the power key is implemented by the fingerprint recognition key, thereby reducing the physical components and thus the fabrication cost of the terminal.

In an embodiment of the present disclosure, the touch parameter includes a touch duration. In this case, if it is detected that the touch parameter meets the preset condition, the processor 320 controls the running state of the terminal by steps of: generating a low-level power switching control signal if the touch duration is greater than or equal to a preset duration threshold; and controlling the running state of the terminal based on a current state of the terminal if the low-level power switching control signal is detected.

If the current state is the turned-on state, the terminal is controlled to be unlocked, to sleep or to be turned off. If the current state is the sleep state, the terminal is controlled to be woken up or to be turned off. If the current state is the turned-off state, the terminal is controlled to be turned on.

In the embodiment, only one preset duration threshold is needed, and the low-level power switching control signal is generated if the touch duration exceeds the preset duration threshold. The processor in the terminal controls the running state of the terminal based on the current state of the terminal, after detecting the low-level power switching control signal, thereby simplifying the user operation and improving the user experience.

In an embodiment of the present disclosure, the touch parameter includes a touch duration. In this case, the processor 320 controls the running state of the terminal in a case where the touch parameter meets the preset condition by steps of: generating a first control signal in a case where the touch duration is greater than or equal to a first preset duration threshold and is less than a second preset duration threshold, and controlling the terminal to sleep or wake up in response to the first control signal; generating a second control signal in a case where the touch duration is greater than or equal to the second preset duration threshold and controlling the terminal to be turned on or turned off in response to the second control signal; and generating a third control signal in a case where the touch duration is less than the first preset duration thresholding and controlling the terminal to be locked in response to the third control signal.

In the embodiment, different control signals are generated based on different touch durations, and the processor in the terminal controls the running state of the terminal in response to the different control signals, thereby achieving an accurate control result.

In another embodiment of the present disclosure, the touch parameter includes a touch duration and a touch pressure. In this case, the processor 320 controls the running state of the terminal in a case where the touch parameter meets the preset condition by steps of: controlling the running state of the terminal in a case where the touch duration is greater than or equal to a preset duration threshold and the touch pressure is greater than or equal to a preset pressure threshold.

In the embodiment, the touch parameter includes the touch duration and the touch pressure, and the running state of the terminal can be controlled only if both the touch duration and the touch pressure meet the preset condition, thereby prevent a misoperation by user and improving the control accuracy.

In an embodiment of the present disclosure, the processor 320 is further configured to, when the touch operation is detected on the fingerprint recognition key, acquire and store fingerprint data, and perform an unlock operation by using the fingerprint data after a system start or a foreground running recovery of the terminal.

A scenario of the foreground running recovery may include waking up a terminal in the sleep state and unlocking a terminal.

In the embodiment, when the touch operation is detected on the fingerprint recognition key, a frame of fingerprint data is collected and stored. An authentication is performed by directly using the collected fingerprint data after the terminal is turned on or the foreground running is recovered. In this case, it is unnecessary for the user to again perform a touch operation on the fingerprint recognition key after the system start or the foreground running recovery, thereby reducing the number of operations by the user and improving the user experience.

In an embodiment of the present disclosure, the input/output device includes a sensory feedback component. In this case, the processor 320 is further configured to control a running state of the sensory feedback component based on the touch parameter of the touch operation.

For example, the sensory feedback component may include an LEI) lamp, a vibrator or a miniature motor.

For example, in a case where the sensory feedback component is the LED lamp, if the touch operation is detected on the fingerprint recognition key, the LEI) lamp is controlled to be lightened or flash, and the brightness and flashing frequency of the LED lamp are controlled based on a duration of the touch operation. In this way, a brightness gradient effect of the LED lamp is achieved in different touch scenarios, thereby enhancing a visual experience of user.

For another example, in a case where the sensory feedback component is the vibrator (or miniature motor), the vibrator (or miniature motor) is controlled to vibrate once when a touch operation is detected on the fingerprint recognition key, thereby enhancing a tactile experience of user.

The terminal herein may be any fingerprint recognition-supported devices, such as a desktop computer, a workstation, a laptop computer, a mobile phone and a tablet computer.

It should be noted that, the embodiments in this specification are described in a progressive way, each of which emphasizes the differences from others, and the embodiments can be referred to each other for the same or similar parts. Since the embodiments of device are similar to the embodiments of method, the description thereof is relatively simple, and for relevant matters references may be made to the description of the method.

The steps in the embodiments of method according to the present disclosure may be adjusted in order, combined and deleted as needed.

The modules and sub-modules in the devices and terminals according to the embodiments of the present disclosure may be combined, divided and deleted as needed.

It can be understood that, the disclosed terminal, device and method in the embodiments may be implemented in other ways. For example, the terminal embodiments described above are merely schematic. For example, the divisions of the units or sub-units are merely logic functional divisions, and there may be other divisions in practice. For example, multiple sub-units or units can be combined, or can be integrated into another system, or some features can be ignored, or not be executed. In addition, the shown or discussed coupling, direct coupling or communication connection between components may be indirect coupling or communication connection via some interfaces, devices or units, which may be electrical, mechanical, or in other form.

The modules or sub-modules described as separate components may be or may not be separated physically, and the components illustrated as a module or sub-module may be or may not be a physical module or sub-module. That is, the components may be located at the same place, or may be distributed on multiple network modules or sub-modules. Some or all of the modules or sub-modules may be selected as required to implement the solutions of the embodiments.

In addition, function modules or sub-modules according to the embodiments of the present disclosure may be integrated into one processing unit, or may be separate units physically, or two or more modules or sub-modules are integrated into one module. The integrated module or sub-module described above may be realized in hardware, or may be realized as a software function module or sub-module.

Finally, it should be further noted that the relationship terminologies such as "first", "second" and the like are only used herein to distinguish one entity or operation from another, rather than necessitate or imply that the actual relationship or order exists between the entities or operations. Furthermore, terms of "include", "comprise" or any other variants are intended to be non-exclusive. Therefore, a process, method, article or device including multiple elements includes not only the elements but also other elements that are not enumerated, or also include the elements inherent to the process, method, article or device. Unless expressively limited otherwise, the statement "comprising (including) a . . . " does not exclude the case that other similar elements may exist in the process, method, article or device.

With the above descriptions of the disclosed embodiments, the skilled in the art may practice or use the present disclosure. Various modifications to the embodiments are apparent for the skilled in the art. The general principle suggested herein can be implemented in other embodiments without departing from the spirit or scope of the present disclosure. Therefore, the present disclosure should not be limited to the embodiments disclosed herein, but has the widest scope that is in conformity with the principle and the novel features disclosed herein.

Those described above are only preferable embodiments of the present disclosure. It should be noted that, for those skilled in the art, improvements and modifications may also be made without departing from the principle of the disclosure. These improvements and modifications should also be included in the scope of protection of the present disclosure.

The invention claimed is:

1. A terminal control method based on a fingerprint recognition key, comprising:
   detecting a touch operation on the fingerprint recognition key;
   acquiring a touch parameter of the touch operation; and
   controlling a running state of a terminal in a case where the touch parameter meets a preset condition, wherein the running state comprises a turned-on state, a turned-off state, a sleep state, an awake state and a locked state, wherein, the touch parameter comprises a touch duration; and
   the controlling a running state of a terminal in a case where the touch parameter meets a preset condition comprises:
      generating a low-level power switching control signal in a case where the touch duration is greater than or equal to a preset duration threshold; and
      controlling the running state of the terminal based on a current state of the terminal in a case where the low-level power switching control signal is detected, wherein the controlling the running state of the terminal based on a current state of the terminal in a case where the low-level power switching control signal is detected comprises:
         in a case where the current state is the turned-on state, controlling the terminal to be locked, to sleep, or to be turned off;
         in a case where the current state is the sleep state, waking up the terminal or controlling the terminal to be turned off; and
         in a case where the current state is the turned-off state, controlling the terminal to be turned on.

2. The terminal control method according to claim 1, wherein the touch parameter comprises a touch duration; and
   the controlling a running state of the terminal in a case where the touch parameter meets a preset condition comprises:
      generating a first control signal in a case where the touch duration is greater than or equal to a first preset duration threshold and is less than a second preset duration threshold, and controlling the terminal to sleep or wake up in response to the first control signal;
      generating a second control signal in a case where the touch duration is greater than or equal to the second preset duration threshold, and controlling the terminal to be turned on or turned off in response to the second control signal; and
      generating a third control signal in a case where the touch duration is less than the first preset duration threshold, and controlling the terminal to be locked in response to the third control signal.

3. The terminal control method according to claim 1, wherein the touch parameter comprises a touch duration and a touch pressure; and the controlling a running state of the terminal in a case where the touch parameter meets a preset condition comprises:
   controlling the running state of the terminal in a case where the touch duration is greater than or equal to a preset duration threshold and the touch pressure is greater than or equal to a preset pressure threshold.

4. The terminal control method according to claim 1, further comprising:
   acquiring and storing fingerprint data when the touch operation is detected on the fingerprint recognition key; and
   performing an unlock operation by using the fingerprint data, after a system start or foreground running recovery of the terminal.

5. The terminal control method according to claim 1, wherein the terminal further comprises a sensory feedback component, and the method further comprises:
   controlling a running state of the sensory feedback component based on the touch parameter of the touch operation.

6. A terminal, comprising:
   a memory,
   a processor, and
   an input/output device, wherein
   the memory is configured to store programs executable by the processor, and
   the processor is configured to execute the programs to perform operations of:
      detecting a touch operation on a fingerprint recognition key;
      acquiring a touch parameter of the touch operation; and
      controlling a running state of the terminal in a case where the touch parameter meets a preset condition, wherein the running state comprises a turned-on state, a turned-off state, a sleep state, an awake state and a locked state, wherein, the touch parameter comprises a touch duration; and the controlling a running state of a terminal in a case where the touch parameter meets a preset condition comprises:
  generating a low-level power switching control signal in a case where the touch duration is greater than or equal to a preset duration threshold; and
  controlling the running state of the terminal based on a current state of the terminal in a case where the low-level power switching control signal is detected,
  wherein the controlling the running state of the terminal based on a current state of the terminal in a case where the low-level power switching control signal is detected comprises:
    in a case where the current state is the turned-on state, controlling the terminal to be locked, to sleep, or to be turned off;
    in a case where the current state is the sleep state, waking up the terminal or controlling the terminal to be turned off; and
    in a case where the current state is the turned-off state, controlling the terminal to be turned on.

7. The terminal according to claim 6, wherein the touch parameter comprises a touch duration; and
  the controlling a running state of the terminal in a case where the touch parameter meets a preset condition comprises:
    generating a first control signal in a case where the touch duration is greater than or equal to a first preset duration threshold and is less than a second preset duration threshold, and controlling the terminal to sleep or wake up in response to the first control signal;
    generating a second control signal in a case where the touch duration is greater than or equal to the second preset duration threshold, and controlling the terminal to be turned on or turned off in response to the second control signal; and
    generating a third control signal in a case where the touch duration is less than the first preset duration threshold, and controlling the terminal to be locked in response to the third control signal.

8. The terminal according to claim 6, wherein the touch parameter comprises a touch duration and a touch pressure; and
  the controlling a running state of the terminal in a case where the touch parameter meets a preset condition comprises:
    controlling the running state of the terminal in a case where the touch duration is greater than or equal to a preset duration threshold and the touch pressure is greater than or equal to a preset pressure threshold.

9. The terminal according to claim 6, the processor is configured to execute the programs to further perform operations of:
  acquiring and storing fingerprint data when the touch operation is detected on the fingerprint recognition key; and
  performing an unlock operation by using the fingerprint data, after a system start or foreground running recovery of the terminal.

10. The terminal according to claim 6, further comprising a sensory feedback component, wherein the processor is configured to execute the programs to further perform an operation of:
  controlling a running state of the sensory feedback component based on the touch parameter of the touch operation.

* * * * *